(12) United States Patent
Staropoli et al.

(10) Patent No.: US 8,800,929 B2
(45) Date of Patent: Aug. 12, 2014

(54) UNDER-WING PYLON MADE OF COMPOSITE MATERIAL

(75) Inventors: Francesco Staropoli, Turin (IT); Marco Basaglia, Varese (IT)

(73) Assignee: Alenia Aermacchi S.p.A., Venegono Superiore (Varese) (IT)

( * ) Notice: Subject to any disclaimer, the term of this patent is extended or adjusted under 35 U.S.C. 154(b) by 185 days.

(21) Appl. No.: 12/450,294

(22) PCT Filed: Mar. 19, 2008

(86) PCT No.: PCT/IB2008/000838
§ 371 (c)(1),
(2), (4) Date: Oct. 6, 2009

(87) PCT Pub. No.: WO2008/117174
PCT Pub. Date: Oct. 2, 2008

(65) Prior Publication Data
US 2010/0090063 A1   Apr. 15, 2010

(30) Foreign Application Priority Data
Mar. 28, 2007   (IT) ............................. MI2007A0617

(51) Int. Cl.
*B64D 1/12* (2006.01)
(52) U.S. Cl.
USPC ........................ 244/137.4; 60/796; 248/554

(58) Field of Classification Search
USPC ........................ 244/54, 137.4; 60/796, 797; 248/554–557
See application file for complete search history.

(56) References Cited

U.S. PATENT DOCUMENTS

| 4,491,292 A | 1/1985 | Mattei |
| 4,589,615 A | 5/1986 | Walker, Jr. |
| 2008/0302234 A1* | 12/2008 | Dortch et al. ................ 89/37.16 |

FOREIGN PATENT DOCUMENTS

| FR | 1 212 985 A | 3/1960 |
| FR | 2 643 332 A | 8/1990 |

OTHER PUBLICATIONS

PCT Search Report dated Aug. 13, 2008.

* cited by examiner

*Primary Examiner* — Timothy D Collins
*Assistant Examiner* — Jamie S Stehle
(74) *Attorney, Agent, or Firm* — Hedman & Costigan, P.C.; James V. Costigan; Kathleen A. Costigan

(57) ABSTRACT

Under-wing pylon for an aircraft which has on the upper side a pin (2) for attaching to the fuselage or to the wings of the aircraft itself, and a connector (3) for connecting the pylon to the aircraft. The pylon has a monolithic framework made with stratified unidirectional and/or woven carbon fibres, impregnated with epoxy resin.

4 Claims, 1 Drawing Sheet

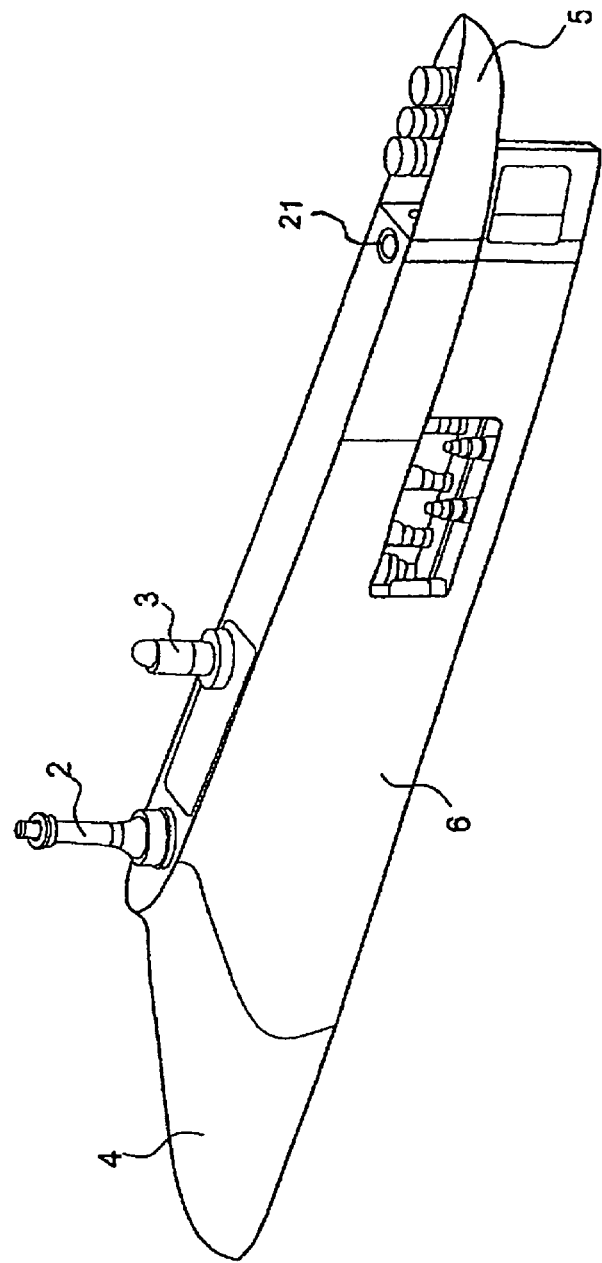

UNDER-WING PYLON MADE OF COMPOSITE MATERIAL

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

REFERENCE TO A MICROFICHE APPENDIX

Not Applicable

BACKROUND OF THE INVENTION

Field of the Invention

The present invention refers to an under-wing pylon made of composite material.

Description of Related Art

In particular, the present invention regards an under-wing pylon made of composite material adapted to allow transport of various types of loads, attached under the wing or fuselage of an aircraft.

Known to the prior art are under-wing pylons for aircrafts comprising assembly of metal parts with parts made of composite material. For example, the U.S. Pat. No. 4,491,292 describes a device for attaching one or more loads under an aircraft whose structure is basically made of a hollow beam made up of one or more simple shaped elements made of fibreglass or other similar composite material and by metal elements coupled with elements made of composite material to provide the beam-aircraft and beam-load connection to be transported.

The applicant observed that such under-wing pylons of the prior art actually being made both of metal and composite metal could have implementation impossibilities due to the criticality of making a structure assembled using various parts, with the structural capacity required to transport substantial loads, in compliance with the dimensional restrictions of the external aerodynamic surface and the overall dimensions of the internal installations.

BRIEF SUMMARY OF THE INVENTION

The applicant proposes an under-wing pylon with the main objective of reducing the weight while increasing the rigidity with respect to the solutions of the known type. In particular, the under-wing pylon according to the present invention is made through a monolithic structure integrally manufactured using composite material.

An aspect of the present invention regards an under-wing pylon for an aircraft comprising on its upper side means for attaching to the fuselage or the wings of the aircraft itself, means of connection of the pylon with the aircraft adapted to provide special interfaces for the installed systems, said pylon having an extended shape, characterized in that it comprises a monolithic framework made through a stratification of carbon fibres, unidirectional and/or woven, impregnated with epoxy resin.

BRIEF DESCRIPTION OF THE SEVERAL VIEWS OF THE DRAWINGS

Further objectives and advantages of the present invention shall be clear from the following description and from the annexed drawings, strictly provided for exemplifying and non-limiting purposes, wherein:

FIG. 1 is a schematic perspective view of the pylon of an aircraft according to the present invention.

DETAILED DESCRIPTION OF THE INVENTION

Referring to the abovementioned FIGURE, the pylon according to the present invention has, on its upper surface, means for attaching to the fuselage or to the wings of the aircraft comprising two points of constraint, the main of which is a coupling pin 2 and the second is a secondary pin 21. In addition, provided on the upper surface of the pylon are means of connection 3 of the same to the aircraft adapted to provide special interfaces of the installed systems.

The pylon has an extended shape and in particular comprises an aerodynamic shaped nose 4 and a tail 5. Between the nose and the tail there is a central portion which represents the main structure of the pylon 6.

The means for attaching the pylon to the fuselage or to the wings of the aircraft are arranged on the upper part with the main constraint generally in proximity to the nose, while the transportable loads are attached to the lower part of the pylon itself. The pylon is made in a monolithic framework obtained by means of stratification of carbon fibres, unidirectional and/or woven, impregnated with epoxy resin.

Such pylon is advantageously obtained through lamination on a female mould, divided into two half-moulds, with the interposition, during the laying operation, of inserts made of synthetic and/or metal material and of transverse septa made of CFC (Carbon Fibre Composite) already polymerised, used as support for the final lamination.

Polymerisation is performed in an autoclave preferably at a temperature around 180° C. and a pressure amounting to 6 bars for example. Finishing operations (drilling and contouring) are performed subsequently.

The invention claimed is:

1. An under-wing pylon for an aircraft having on an upper side two points of constraint for attaching said pylon to the fuselage or wings of an aircraft, said points of constraint consisting of a coupling pin (2) and a secondary pin (21), for connecting said under-wing pylon to a fuselage or to wings of the aircraft; the pylon comprises a connector (3) adapted to provide special interfaces for installed systems, said pylon having an extended shape, a primary structure (6) having an aerodynamic shaped nose (4), a. tail (5) and a single monolithic framework integrally made through a stratification of unidirectionally arranged and/or woven carbon fibres that are impregnated with resin.

2. The pylon according to claim 1, wherein the points for attaching the pylon to the fuselage or to the wings of the aircraft are arranged on the upper side with coupling pin (2) generally in proximity to the nose (4), while transportable loads are attached to a lower part of the pylon itself.

3. The pylon according to claim 1 which is obtained through lamination in a female mould that is divided into two half moulds.

4. An under-wing pylon for an aircraft having on an upper side only two points of constraint for attaching said pylon directly to the fuselage or wings of an aircraft, said points of constraint consisting of a coupling pin (2) and a secondary pin (21), for connecting said under-wing pylon to a fuselage or to wings of the aircraft; the pylon having a connector (3) adapted to provide special interfaces for installed systems, said pylon having an extended shape, a primary structure (6) having an aerodynamic shaped nose (4) a tail (5) and a single monolithic framework that consists of an integral framework made by the stratification of unidirectionlly arranged and/or woven carbon fibres that are impregnated with epoxy resin.

\* \* \* \* \*